United States Patent [19]

Mueller

[11] Patent Number: 4,666,175
[45] Date of Patent: May 19, 1987

[54] BICYCLE FRAME WITH ASYMMETRIC CHAIN STAY FOR PERFORMING FREESTYLE MANEUVERS

[75] Inventor: Clifford F. Mueller, Arlington Heights, Ill.

[73] Assignee: Schwinn Bicycle Company, Chicago, Ill.

[21] Appl. No.: 866,794

[22] Filed: May 23, 1986

[51] Int. Cl.⁴ .............................................. B62J 25/00
[52] U.S. Cl. ................................. 280/291; 280/281 R
[58] Field of Search ............. 280/291, 281 R, 289 H, 280/289 G, 289 A, 289 R, 289 E

[56] References Cited

U.S. PATENT DOCUMENTS

| | | | |
|---|---|---|---|
| 519,579 | 5/1894 | Jones | 280/291 |
| 593,678 | 11/1897 | Neider | 280/291 |
| 2,491,379 | 12/1949 | Kraeft et al. | 280/281 R |
| 3,773,355 | 11/1973 | Swartz | 280/291 |
| 4,335,876 | 6/1982 | Westernoff | 280/289 H |

OTHER PUBLICATIONS

*Freestylin' Magazine*, May, 1986, pp. 8 and 9, 11, 16 and 17, 33 and 60.
*Freestyle Magazine*, Apr. 1986, pp. 32-35.
*Freestylin' Magazine*, Jun., 1986, pp. 4, 47, 52.
*BMX Action Magazine*, May, 1986, p. 60.

Primary Examiner—John J. Love
Assistant Examiner—Donn McGiehan
Attorney, Agent, or Firm—McCaleb, Lucas & Brugman

[57] ABSTRACT

A bicycle frame with asymmetric chain stays. The rear caliper brake is mounted across the underside of the chain stay tubes. The chain stay tubes are asymmetric. The front portion of the chain stay tube on the left side, opposite the chain, is curved farther outwardly from the centerline of the frame than the corresponding front portion of the other chain stay tube to provide a first step completely covering the end of the brake actuating arm to provide a support for a performer's foot while protecting the brake actuating arm from foot pressure. Second, third, fourth, and fifth foot-supporting steps or standing platforms are provided respectively by an upwardly-arched tube secured across the seat stay tubes, outwardly-curved rear portions of the chain stay tubes extending past the rear axle, and a diagonal tube secured between the down and seat tubes.

7 Claims, 4 Drawing Figures

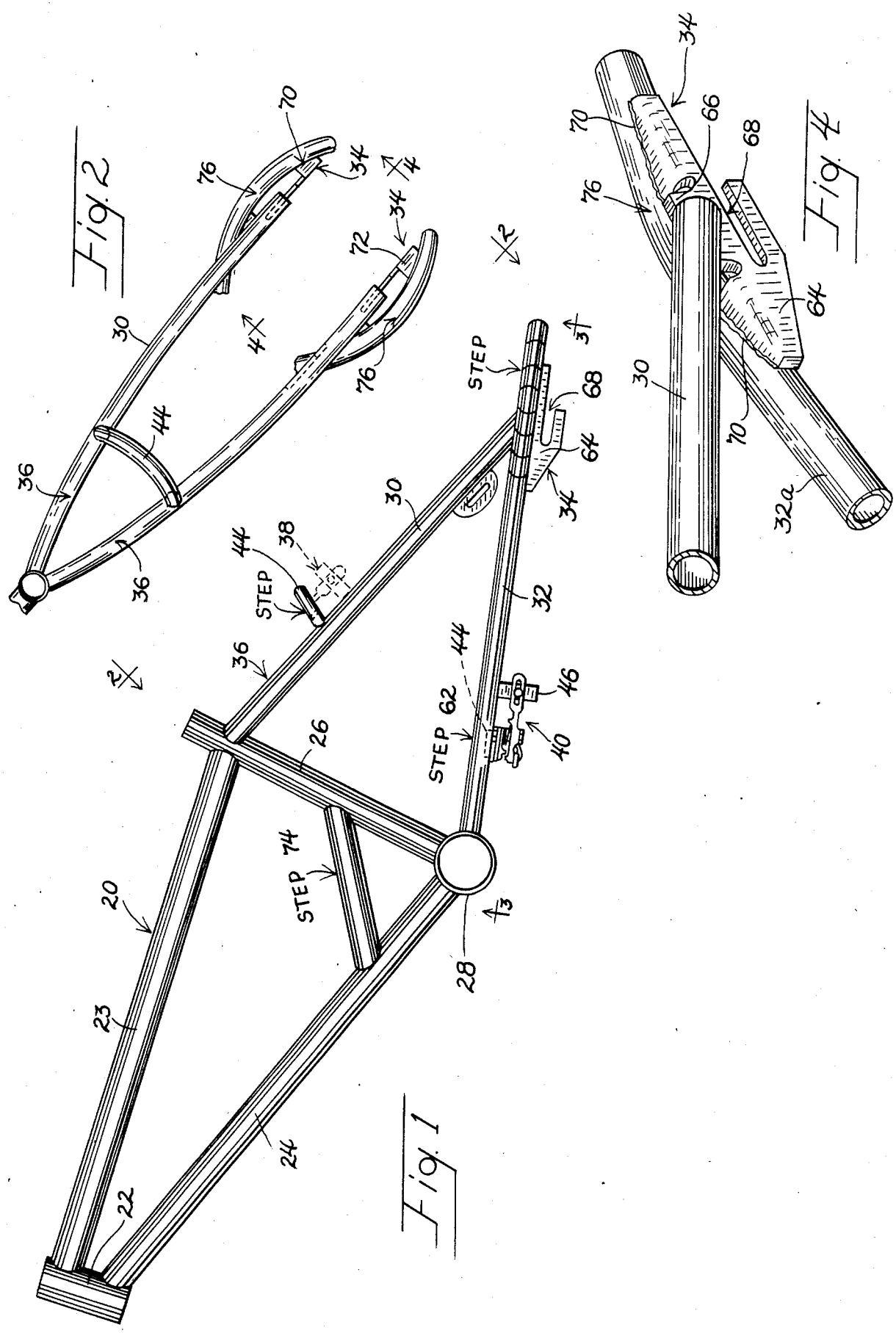

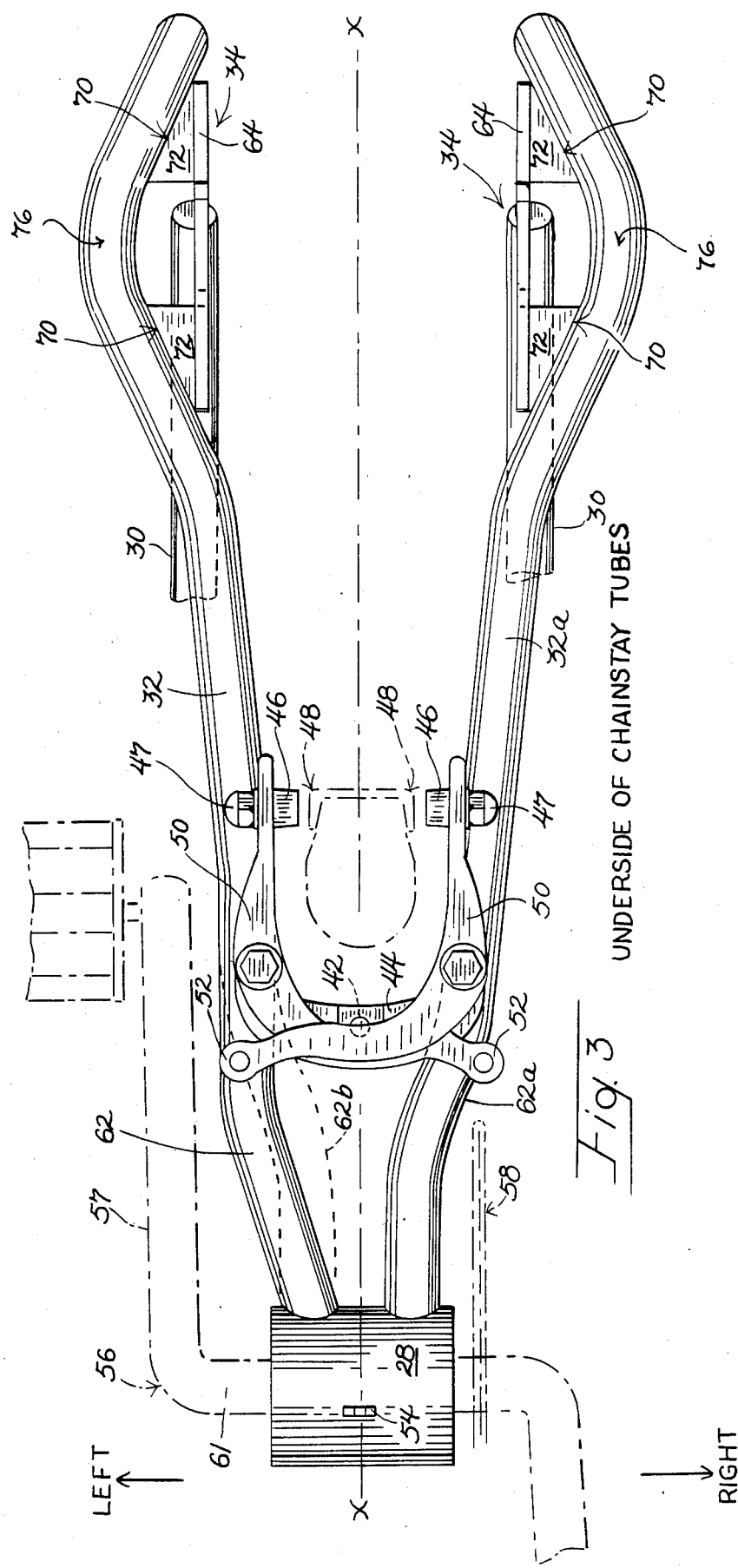

BICYCLE FRAME WITH ASYMMETRIC CHAIN STAY FOR PERFORMING FREESTYLE MANEUVERS

BACKGROUND OF THE INVENTION

This invention relates to a special kind of sports bicycle called a BMX or Freestyle bike. Typically, these have a low profile with wheel diameters of 20 inches or less and are extremely rugged. They are used for sprinting, racing, and a wide variety of trick maneuvers, such as climbing an inclined ramp and dropping to a track below, riding or balancing the bike while tilted upright on its rear wheel, riding or coasting while seated or standing on the handlebar cross-bar, or with the rider's feet or hands supported on tires, handlebars, and various frame portions which may be added as accessories or provided as integral original parts of the frame.

As examples, some front forks have horizontal stub shafts. A step-like rear extension of the top tube provides a standing platform beneath the seat in some of these bikes. Bolted standing platforms are provided as add-on accessories which may be secured to one or both ends of the rear axle or to the end portions of the chain stay tubes.

One favorite standing platform for freestyle performers is provided at the top of the seat stay tubes just behind and below the seat. However, because the rear caliper brake typically is secured to the top of a bridge interconnecting the seat stay tubes at that location the upstanding brake and its actuating cable can interfere with the performer's feet and severely limit the standing space available.

Examples of attempts to provide uncluttered, standing room behind and below the seat include providing a relatively free standing area on the seat stay tubes between the rear brake and the seat mast as shown in the GT Pro Series and Redline BMX bikes illustrated on pages 6, 7, and 8, 9 of the March, 1986 *BMX Action* Magazine.

Other examples involve extending the top tube rearwardly beneath the seat to provide a rear standing platform above and clear of the rear brake calipers. Such standing platforms are shown on the Kanahara and Hutch BMX bikes illustrated respectively on pages 23 and 47 of the March, 1986 *BMX Action* Magazine.

In an attempt to increase the clear footroom on the top of the seat stay tubes, in some models, the rear caliper brake has been secured on the underside of the seat stay tubes. While an improvement, it has not been entirely satisfactory because the performer's foot could overhang the seat stay tube, engage the caliper brake arm, and interfere with operation of the brake.

Other favorite rear standing platforms or support surfaces include axial stub extensions on or near the rear axle. These may be permanently secured by welding, or screwed or bolted on as optional accessories, examples of which are shown in advertisements appearing on pages 8, 12, 37, 39, and 42 of *Freestyle* Magazine for April, 1986.

SUMMARY OF THE INVENTION

A general object of the present invention is to provide a plurality of unique standing platforms on a BMX or Freestyle type bicycle to facilitate performing freestyle maneuvers.

One object of the invention is to secure the rear caliper brake on the underside of the chain stay tubes, instead of at the conventional location on the upperside of the seat stay tubes, and provide a footstep or standing platfom across the tops of the seat stay tubes below the seat which is freely accessible to a freestyle performer's foot from either side, to avoid any possible entanglement with the caliper brake arms or the rake actuating cable.

Another object is to provide a bicycle frame in which the rear caliper brake is secured across the underside of the chain stay tubes and the chain stay tubes have asymmetric configurations with the front portions of one curving or bulging outwardly sufficiently to provide a foot-engagable step or standing platform which overhangs the corresponding brake actuating arm and protects the arm from pressure by the rider's foot.

Another object is to provide such a bicycle frame in which the rear end portions of the chain stay tubes extend laterally outwardly around the ends of the rear exle to provide a pair a foot-supporting step on either side for supporting the feet during freestyle maneuvers.

Another object is to secure a diagonal tube between the down and seat tubes to provide an additional standing platform for performing freestyle maneuvers.

BRIEF DESCRIPTION OF THE DRAWINGS

Other objects and advantages will be apparent from the following description taken in connection with the drawings in which:

FIG. 1 is a side view of a bicycle frame with a brake assembly attached illustrating one form of the present invention;

FIG. 2 is a fragmentary top view of FIG. 1 taken in the direction of arrows 2—2;

FIG. 3 is a fragmentary, enlarged bottom view of FIG. 1 taken in the direction of arrows 3—3; and FIG. 4 is a fragmentary, enlarged perspective view of a unique rear fork end fitment providing a connection between one of the seat stays and a corresponding chain stay.

Like parts are referred to by like reference characters throughout the figures of the drawings.

DETAILED DESCRIPTION OF THE PREFERRED EMBODIMENT

Referring now to the specific embodiment of the invention shown in the drawings, a frame for a BMX or Freestyle type bicycle is generally designated 20 and is of the familiar "diamond" pattern consisting of a head tube 22, top tube 23, down tube 24, seat tube or mast 26, bottom bracket shell 28, seat stay tubes 30,30, left and right chain stay tubes 32,32a respectively, and rear fork end fitments (drop-outs) 34,34.

As stated, one favorite stading platform for freestyle performers is on the seat stay tubes at the location 36 just behind the seat tube 26. In the conventional BMX bike, this location is not completely free because the rear caliper brake is on the upper side of the seat stay tubes as shown in broken lines at 38 in FIG. 1. It can be distracting and even dangerous for a rider to keep his or her feet from becoming entangled with the brake or brake actuating cable while performing freestyle maneuvers.

In the present invention, the caliper brake 40 has in effect been moved from the location 38 to the underside of the chain stay tubes as shown in solid lines in Fig. 1 where it is secured in the usual manner by a center bolt 42 (FIG. 3) extending through a bridge 44 welded or brazed between the chain stay tubes 32,32a. This provides a completely free and uncluttered standing platform at position 36 at the top end portions of the seat stay tubes. An upwardly arched cross tube 44 is welded or brazed across the seat tubes to provide an additional step as well as a rear margin for the stepping platform at location 36.

The caliper brake 40 may be of the conventional type having a pair of brake shoes 46,46 fastened by bolts 47,47 and engagable with opposite side surfaces 48,48 of the rear wheel rim. Springs (not shown) urge brake-shoe-carrying arms 50,50 apart to normally disengage the shoes from the rim. At the opposite ends of the brake arms 50,50, brake actuating arms 52,52 are engagable by a yoke (not shown) connected to a cable (not shown) extending through guide 54 on the underside of the bottom bracket shell 28. Pulling on the cable (leftwise in FIG. 3) squeezes the brake shoes 46,46 into frictional engagement with the sides of the wheel rim.

A crank arm assembly 56 with cranks 57, pedals 59 and center shaft 61, is shown in broken lines and will be journaled in the usual way for rotation within the bottom bracket 28. A drive sprocket 58 is conventionally located on the right hand side.

Another favorite standing platform for freestyle performers is the forward step portion 62 on the left hand chain stay tube 32, opposite the drive sprocket 58. This step is immediately above the brake arm 52 location as shown in FIGS. 1 and 3.

As shown in FIG. 3, the chain stay tubes 32,32a are asymmetric. This is an important feature of the present invention. The forward step portion 62 of the left hand chain stay tube, opposite the drive sprocket 58, is bulged or curved outwardly immediately behind the bottom bracket shell 28, relative to the centerline X—X of the frame, more than the corresponding forward portion 62a of the right hand chain stay tube. Thus, as shown in that figure, the portion 62 completely overhangs the end of the left hand end of the brake actuating arm 52 thereby positively preventing accidental engagement and interference with the brake arm by the performer's foot, even if his foot slips off the chain stay tube during maneuvers.

That outwardly bulged configuration 62 of the chain stay tube is not desired or even possible on the right hand side because it would interfere with the space required by the sprocket 58.

To emphasize the above-mentioned asymmetry of the chain stay tubes, FIG. 3 shows in broken lines at 62b the corresponding forward portion of the left hand chain stay tube 62 if it were symmetrical with the opposite chain stay tube.

Still other favorite standing platforms for freestyle performers are at the rear axles. There may be optional, extra standing steps or internally threaded tubular stubs fastened onto the ends of the rear axle, or curved tubes or flat plates welded, brazed or otherwise secured to the outside of the chain stays or rear fitments. All of these embodiments are makeshifts and may interfere with or limit fore and aft adjustments of the rear axle relative to the rear dropout fitments.

In the present invention, a pair of special, rear fork end dropout fitments 34,34 provide permanent, wide standing platforms at opposite ends of the rear axle and do not interfere with or limit fore and aft adustment of the rear axle. They are slightly above the rear axle, allowing ready access to the rear axle nut (not shown).

Referring more specifically to the improved rear fork end dropout fitments 34,34, each comprises a vertical plate portion 64 with its upper mid-section 66 affixed as by welding or brazing to the rear end of the corresponding seat stay tube 30, and a rearwardly-open, generally-horizontal slot 68 to receive an end of the rear axle. At the fore and aft ends, curved outer edges 70,70 of outturned horizontal portions 72,72 are welded or brazed to the inside curved rear end portions of the chain stayubes. These provide amply wide, curved standing platforms 76 at opposite ends of the rear axle for a wide variety of maneuvers.

A diagonal tube 74 is secured by welding or brazing between the down tube 24 and seat tube or mast 26 to provide an additional step or standing platform for freestyle maneuvers.

While a particular example of the present invention has been shown and described, it will be apparent that changes and modifications may be made without departing from the invention. The aim of the appended claims, therefore, is to cover all such changes and modifications included within the spirit and scope of the invention.

The embodiments of the invention in which an exclusive property of privilege is claimed are defined as follows:

1. In a freestyle bicycle for performing freestyle maneuvers having a frame of the type including a tubular top tube having front and rear ends, a tubular seat tube having top and bottom ends with the top end secured to the rear end of said top tube, a tubular head tube having top and bottom ends with the top end secured to the front end of said top tube, a tubular down tube having top and bottom ends with the top end secured to the bottom end of said head tube, a pair of chain stay tubes having front and rear ends, a pair of seat stay tubes having top and bottom ends with the top ends secured to the top end of said seat tube, a bottom bracket secured to the bottom ends of said seat and down tubes and the front ends of said chain stay tubes, two rear fork dropout ends secured to the rear and bottom ends, respectively, of said chain stay and seat stay tubes, the improvement wherein:

an upwardly arched tube is secured across the seat stay tubes behind the seat tube to provide a step behind the seat tube defining a standing platform on the seat stay tubes which platform is free and uncluttered for access on either side by either foot of a rider performing freestyle maneuvers; and a rear caliper brake is mounted across the underside of the chain stay tubes and has lateral brake actuating arms extending outwardly beneath the chain stay tubes, at least one of said chain stay tubes extending sufficiently outwardly to completely overhang the end of the respective brake actuating arm and protect the arm from engagement by a performer's foot when using the chain stay tube as a step during freestyle maneuvers.

2. In a freestyle bicycle for performing freestyle maneuvers having a frame of the type including a tubular top tube having front and rear ends, a tubular seat tube having top and bottom ends with the top end secured to the rear end of said top tube, a tubular head tube having top and bottom ends with the top end secured to the front end of said top tube, a tubular down tube having top and bottom ends with the top end secured to the bottom end of said head tube, a pair of chain stay tubes each having front and rear ends, a pair of seat stay tubes each having top and bottom ends with the top ends secured to the top end of said seat tube, a bottom bracket shell secured to the bottom ends of said seat and down tubes and the front ends of said chain stay tubes, two rear fork dropout ends secured to the rear and bottom ends, respectively, of said chain stay and seat stay tubes, said bottom bracket shell being adapted to rotatably journal therein a pedal crank shaft having a sprocket alongside and adjacent to the front end of one of said chain stay tubes, the improvement wherein:

a rear caliper brake is mounted across the underside of the chain stay tubes and has lateral brake actuating arms extending outwardly beneath the chain stay tubes; and said chain stay tubes are asymmetric, with the front portion of the other chain stay tube, opposite said one chain stay tube, being curved farther outwardly from the centerline of the frame than the corresponding front portion of said one chain stay tube, to provide a step completely covering the end of the brake actuating arm beneath said other chain stay tube to provide a support for a performer's foot while preventing contact with the brake actuating arm during freestyle maneuvers.

3. A bicycle frame according to claim 2 in which each rear fork dropout end comprises a central vertical plate portion with the bottom end of a corresponding seat stay tube being secured to it, said vertical plate portion having a slot to receive the corresponding end of a rear axle, and a laterally outwardly extending horizontal plate portion secured along its outer edge to the rear end portion of a corresponding chain stay tube.

4. A bicycle frame according to claim 3 in which the rear end portion of each chain stay tube comprises a laterally outwardly extending standing platform at a level above that of the rear axle.

5. A bicycle frame according to claim 2 in which a diagonal tube is secured between the down and seat tubes to provide an additional standing platform for performing freestyle maneuvers.

6. A bicycle frame according to claim 2 in which an upwardly-arched tube is secured across the upper surfaces of the seat stay tubes to provide an additional standing platform for freestyle maneuvers.

7. In a freestyle bicycle for performing freestyle maneuvers having a frame of the type including a tubular top tube having front and rear ends, a tubular seat tube having top and bottom ends with the top end secured to the rear end of said top tube, a tubular head tube having top and bottom ends with the top end secured to the front end of said top tube, a tubular down tube having top and bottom ends with the top end secured to the bottom end of said head tube, a pair of chain stay tubes each having front and rear ends, a pair of seat stay tubes each having top and bottom ends with the top ends secured to the top end of said seat tube, a bottom bracket shell secured to the bottom ends of said seat and down tubes and the front ends of said chain stay tubes, two rear fork dropout ends secured to the rear and bottom ends, respectively, of said chain stay and seat stay tubes, said bottom bracket shell being adapted to rotatably journal therein a pedal crank shaft having a sprocket alongside and adjacent to the front end of one of said chain stay tubes , the improvement wherein:

a rear caliper brake is mounted across the underside of the chain stay tubes and has lateral brake actuating arms extending outwardly beneath the chain stay tubes;

said chain stay tubes being asymmetric, with the front portion of the other chain stay tube extending farther outwardly from the centerline of the frame than the corresponding front portion of said one chain stay tube to provide a first step completely covering the end of the brake actuating arm beneath said other chain stay tube to provide a standing platform for a performer's foot while preventing contact with the brake actuating arm during freestyle maneuvers;

an upwardly-arched tube secured across the upper surfaces of the seat stay tubes to provide a second step;

said chain stay tubes having outwardly-curved rear portions extending past the rear axle to provide third and fourth steps; and a diagonal tube secured between the down and seat tubes to provide a fifth step.

* * * * *

UNITED STATES PATENT AND TRADEMARK OFFICE
CERTIFICATE OF CORRECTION

PATENT NO. : 4,666,175
DATED : May 19, 1987
INVENTOR(S) : Clifford F. Mueller

It is certified that error appears in the above—identified patent and that said Letters Patent is hereby corrected as shown below:

IN THE SPECIFICATION:

In column 2, line 6; "or the rake" should be -- or the brake --.

In column 3, lines 64 and 65; "wide standing" should be -- wide, standing --.

Signed and Sealed this

Thirteenth Day of October, 1987

Attest:

DONALD J. QUIGG

Attesting Officer

Commissioner of Patents and Trademarks